Sept. 9, 1969 R. RENOUX 3,466,051

MINIATURE RECORD-PLAYERS

Filed March 8, 1968

United States Patent Office 3,466,051
Patented Sept. 9, 1969

3,466,051
MINIATURE RECORD-PLAYERS

Robert Renoux, Paris, France, assignor to CSF—Compagnie Generale de Telegraphie Sans Fil, a corporation of France Filed Mar. 8, 1968, Ser. No. 711,602
Claims priority, application France, Nov. 17, 1967, 128,687
Int. Cl. G11b *17/06*
U.S. Cl. 274—15 5 Claims

ABSTRACT OF THE DISCLOSURE

A record-player comprises a fork-shaped pick-up arm and a first arc-shaped, cam carrying part pivotably mounted at one end under the turntable and whose other end carries a cam, which can cooperate with the lower prong of the pick-up arm, for this arm to be returned to its rest position at the end of a playback of a record, and a pin extending towards a second cam carrying part. This second cam carrying part is controlled by a push-button for rejecting the pick-up arm and comprises a plate for lifting the lower prong of the arm and for cooperating with the pin of the first cam carrying part when rejection of the arm is desired.

The present invention relates to a mechanism for the automatic control of the various movements necessary in a miniaturized record-player.

Such record-players are in particular intended for use with flexible 100 mm. diameter records, sometimes called "pocket records." In known record-players for conventional records, the handling of the pick-up arm can be at least partially manual. However, for miniaturized record-players, which are intended for operation in any position, it becomes absolutely imperative that all the motions of the pick-up arm (start of play, return to the rest position after play, rejection of the arm during play) should be carried out automatically.

It is an object of this invention to provide an automatic control having those characteristics.

According to the invention, there is provided a record-player comprising: a turntable for bringing into rotation about an axis a record to be played; a fork-shaped pick-up arm having an upper prong, carrying a pick-up having a stylus, and a lower prong; a first cam carrier part, pivoted under said turntable, for causing said arm to retract upon cooperation of said part with said lower prong; a second cam carrier part for lifting said arm, for possible rejection thereof in the course of a playback of said record; first means for bringing said second cam carrier part into cooperation with said lower prong and said first cam carrier part; and switching means for controlling the rotation of said turntable.

Figure 1:
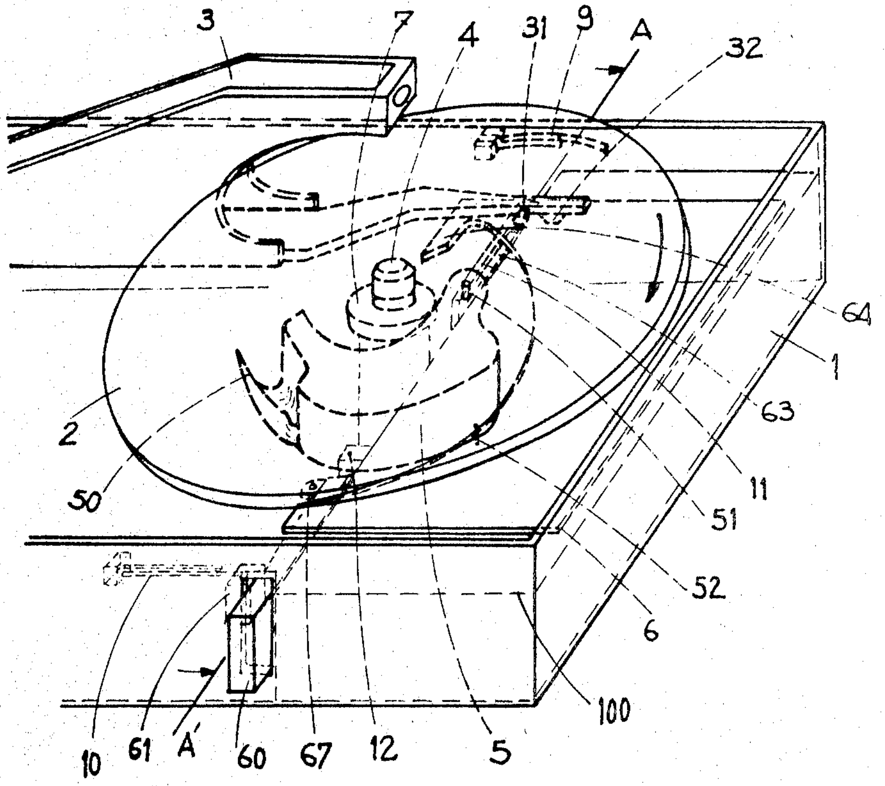
Figure 2:
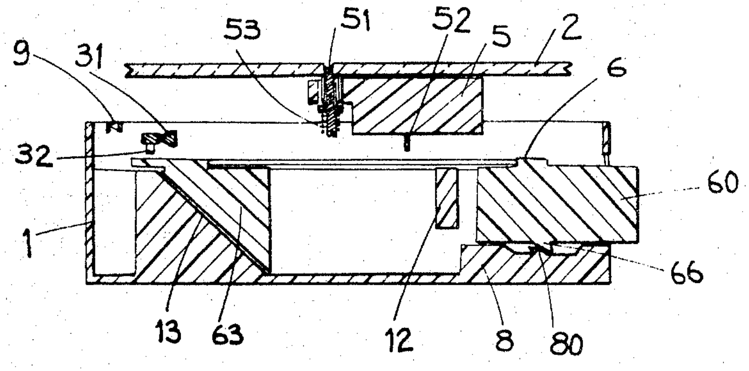

For a better understanding of the invention and to show how the same may be carried into effect, reference will be made to the drawings accompanying the following specification and in which:

FIG. 1 is a perspective view of the record-player according to the invention; and FIG. 2 is a section AA′ of the record-player of FIG. 1 along a vertical plane thereof.

The record-player shown in the drawings comprises, within a casing 1 whose bottom has a raised flat part 100, a turntable 2 which can be driven, for example, by means of a belt engaged in a groove formed around the edge of the turntable. This turntable rotates about a spindle 4, which supports it on a shoulder 7. For clarity of the drawing, the turntable has been assumed to be transparent.

The pick-up arm 3 is in the form of a fork; the pick-up (not shown) is fixed to the upper prong of the arm and the lower prong comprises laterally a horizontal projection 31 in the form of a truncated cone, and on its lower face, a projection 32. A circular arc-shaped cam carrier part 5 is pivotably mounted underneath the turntable 2 on a pivot 51. In the rest position this part is kept in contact with the shoulder 7 of the spindle 4 by means of a return-spring 53.

The free end of the part 5 is formed with a groove, the outer wall of which serves as a cam 50. The cam 50 is, in the rest position, at a distance from the spindle 4 greater than the distance between the spindle 4 and the pivot 51. Furthermore the part 5 carries, near its free end, a pin 52, also at a distance from the spindle 4 greater than the distance between the spindle 4 and the pivot 51. A second cam carrier part is arranged below the lower prong of the pick-up arm 3. It is formed by a plate 6 which can rest upon the casing portion 100. Plate 6 carries on its lower face a vertical wedge-shaped plate 63 whose edge forms 45° with the vertical and serves as a cam. The plate 63 is guided vertically by a plate 11, integral with the casing, and by the wall between the bottom of the casing and the upper surface of the raised flat portion 100. The camming edge 63 can slide upon the plane 13 inclined at 45°, integral with the wall 11 and with the casing.

The plate 6 is integrally connected to a push-button 60 carrying a stop 61. A stop 12, integral with the casing, limits the displacements of the button 60 in the direction of pushing. Oblique return springs, the point of anchorage of one of which upon the push-button 60 is indicated at 67, keep the plate 6 in contact with the raised part of the casing in the rest position, as shown in the drawings.

The turntable motor and the amplifier are fed in parallel through a switch 9, which is normally closed, and a switch 10, which is normally open. The push-button 60 can be kept in the pushed position by means of a catch 66 which engages with a corresponding catch 80 on a part 8 integral with the casing.

Starting from the position shown in the drawings, in which a record (not shown) is being played, the operation of the record-player according to the invention is as follows:

The pick-up arm being in the lowered position, the stylus of the pick-up is engaged in the record groove. The projection 32 is about one millimetre above the plate 6, as is also the pin 52 of the cam carrier part 5. The contact breaker 9 is closed, assuring the supply to the motor and to the amplifier, and the turntable 2 rotates in the direction shown by the arrow. When the sapphire stylus reaches the end of the record carrying area, it is guided by the lead-out groove to the final groove of the record which is a circular groove of standardized location. The distance from the free end of the cam carrier part 5 to the spindle 4 is such that, in the course of the movement of the sapphire stylus in the final groove, the cam 50 comes into engagement with the projection 31. While the turntable goes on rotating, the cam 50 lifts the pick-up arm by an amount, say 3 millimetres, sufficient to disengage the sapphire stylus from the grooves. The projection 31 reaches then the end of the cam 50. At that instant, the turntable continuing to rotate, the cam carrier part 5 is caused to pivot about the pivot 51. The free end of the part 5, which is stopped by the pick-up arm 3 by means of the pin 31, thus moves further away from the spindle 4 and pushes the pick-up arm back towards its rest position. The movement stops at the instant when the arm reaches this latter position and when the lower prong of this pick-up arm opens the contact breaker 9. A new period of play is started by lifting the push-button 60. The button 60 then closes momentarily the contact breaker 10, which sends a pulse to the motor. This pulse is sufficient to cause the turntable 2 to advance until the cam 50, its side contacting the side of the pick-up arm 3, disengages itself from the pin 31. The part 5 is returned then by the spring 53 to its position of rest whilst the pick-up arm 3 is lowered again towards the record. This movement frees the contact breaker 9 which closes again ensuring the supply to the motor and to the amplifier for new period of playback. The stop position of the arm is, of course, so arranged that, when it is lowered again, the stylus enters the lead-in groove of the record.

Furthermore, the system according to the invention makes it possible for the pick-up arm to be returned to its rest position if at any instant during playback, the listener wishes to stop the record playback. It suffices to this end to push the button 60 until the catch 66 is engaged. This movement results in raising the plate 6 by about 3 millimetres, due to the cam 63 sliding upon the ramp 13. The plate 6 bears on the projection 32 and lifts the arm 3. The stylus is then disengaged from the groove. The turntable continuing to rotate, the pin 52 comes into contact with the ramp 64 of the plate 6. The distance between the pin 52 and the spindle 4 being greater than the distance between the pivot 51 and the spindle 4, the part 5 swivels about the pivot 51, the outer side of the part 5, which is suitably shaped, comes into contact with the lower prong to the pick-up arm 3 and then moves it back as the turntable rotates about the spindle 4 and as the part 5 swivels around the pivot 51, until the arm reaches its rest position where it opens the contact breaker 9 and cuts off the supply to the motor and to the amplifier.

To start a new playback of a record, one must move the button 60 upwards to disengage the catch 66. Under the action of the springs, the part 6 then returns to its rest position, disengaging the pin 52 of the part 5, which returns to its rest position, thus allowing the pick-up arm to be lowered again for a new period of playback. In fact, the upward movement of the button 60 gives, by means of the contact breaker 10, a pulse to the motor which suffices for starting a new period of playback.

Of course, the invention is not limited to the embodiment described and shown which was given merely by way of example. Thus other shapes of cam carrier parts can be used which fulfil the same functions through the intermediary of similar cams.

What is claimed is:

1. A record-player comprising: a turnable for bringing into rotation about an axis a record to be played; a fork-shaped pick-up arm having an upper prong, carrying a pick-up having a stylus, and a lower prong carrying a first pin; a first came carrier part comprising a circular arc-shaped part, having one end rotatably mounted about a pivot fixed underneath said turntable and a second end carrying a cam and a second pin at a distance from said axis greater than the distance between said axis and said pivot, said cam cooperating with said first pin, at the end of the playback, for causing said arm to be lifted and to be returned to its rest position; a second cam carrier part for lifting said arm and cooperating with said second pin, for possible rejection of said arm in the course of a playback of said record; first means for bringing said second cam carrier part into cooperation with said lower prong and said second pin; and switching means for controlling the rotation of said turntable.

2. A record-player as claimed in claim 1, wherein said first pin has a truncated-cone shape and said cam comprises a camming portion bounding a groove and limited by a stop.

3. A record-player as claimed in claim 1, wherein said second cam carrier part comprises means, carrying a second cam and disposed under said lower prong, for lifting said arm and for cooperating with said second pin, for said circular arc-shaped part to cause said arm to be returned to said rest position upon said first means being controlled for rejection of said arm during the playback of said record.

4. A record-player as claimed in claim 3, wherein said means carrying a second cam comprise a plate parallel to said turnable, said second cam comprises a first ramp, at an angle with said turntable and laterally guided, and said first means comprise a push-button integral with said plate and acting in the plane of said first ramp for said arm to be rejected upon said button being pushed in a direction parallel to said turntable.

5. A record-player as claimed in claim 4, wherein said switching means comprise a first and a second contact breaker in parallel, for controlling the rotation of said turntable, said first contact breaker is arranged for being briefly closed upon said push-button being briefly moved normally to said turntable and said second contact breaker is arranged for being opened upon said arm being in said rest position.

References Cited

UNITED STATES PATENTS

| | | | |
|---|---|---|---|
| 3,090,625 | 5/1963 | Hansen | 274—15 |
| 2,287,727 | 6/1942 | Cranmer | 274—10 |

LEONARD FORMAN, Primary Examiner

F. J. D'AMBROSIO, Assistant Examiner

U.S. Cl. X.R.

274—14